May 8, 1962 H. GOLDE 3,033,608
VEHICLE ROOFS
Filed Feb. 19, 1959 3 Sheets-Sheet 1

INVENTOR
HANS GOLDE

May 8, 1962 H. GOLDE 3,033,608
VEHICLE ROOFS
Filed Feb. 19, 1959 3 Sheets-Sheet 2
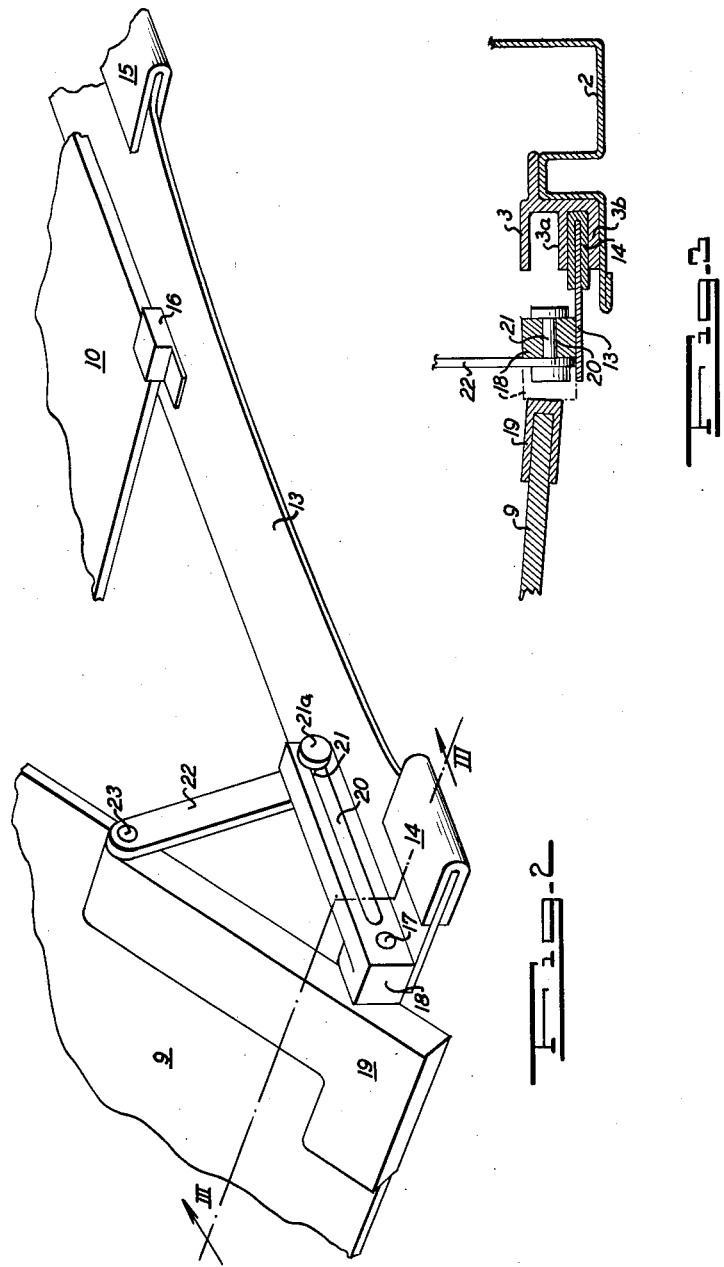
INVENTOR
HANS GOLDE May 8, 1962 H. GOLDE 3,033,608
VEHICLE ROOFS
Filed Feb. 19, 1959 3 Sheets-Sheet 3

INVENTOR
HANS GOLDE

United States Patent Office 3,033,608
Patented May 8, 1962

3,033,608
VEHICLE ROOFS
Hans Golde, 338 Hanauer Landstrasse,
Frankfurt am Main, Germany
Filed Feb. 19, 1959, Ser. No. 794,346
Claims priority, application Germany Feb. 22, 1958
6 Claims. (Cl. 296—137)

The invention relates to a vehicle roof.

In known vehicle sliding roofs the top sliding roof part comprises either a folding cloth part or a rigid sliding cover, for instance, of steel or plastic. Also, in the known constructions, the head lining comprises either a flexible frame over which soft cloth is stretched, or a rigid cover, known as a trim panel, either of which must be moved into the open position together with the top sliding roof part. Light cannot pass through such sliding roofs and head linings.

It is an object of the invention to provide a slidable rigid lining cover in substitution for the known head linings, the rigid lining cover admitting some light and, if required, air into the vehicle.

It is another object of the invention to provide such a lining cover for displacement in the aperture of the roof independently of the top sliding roof part (roof top panel or foldable roof top), so that when the latter is open, the entry of light and air can be selectively controlled. The lining cover can be moved independently of the sliding top roof part either in both directions and when the last-mentioned part is in the open position, the lining cover may remain closed. On the other hand, the lining cover can be displaced when the latter is moved into the closed position.

It is another object of the invention to divide such a lining cover into at least two component cover parts, one of which is tiltable relatively to the other, when the top sliding roof part is at least partly open, the tiltable component cover part thereby providing protection as a windbreak to prevent the slipstream from entering the front of the vehicle. The tiltable cover part also acts as a sun visor preventing the direct entry of bright light into the vehicle from the front or from obliquely above the vehicle. Also, the tiltable lining cover part or the other lining cover part provide protection against light rain without any need to close the top sliding roof part.

According to the present invention, there is provided a vehicle roof comprising portions defining an aperture in said roof, an upper sliding roof portion for closing said aperture, at least two rigid sliding roof portions, arranged to move independently of said upper sliding roof portion for blocking said aperture. Further contemplated is a pair of substantially parallel guide means each being on a respective one of the first said portions and operatively associated with said upper sliding roof portion for guiding the same. Frame members are provided which are displaceable in the guide means independently of the upper roof portion. The two rigid lower roof portions are supported on and displaceable with the frame members. Further provided is tilter means operatively associated with one of the rigid lower roof portions for tilting said one portion out of alignment with the other of the lower roof portions.

A lining cover according to the invention can be made, for instance, of a colorless and transparent material. Alternatively, for instance, to reduce light dazzle, this material can be colored to suit the customer's taste or it can be made of a translucent or opaque material, for instance metal, and, if so, is formed with appropriate apertures. Such a lower lining cover, since it can be moved independently of the top sliding roof part, can be located in any desired position when the top sliding roof part is wholly or partly open. With the use of such a lining cover there is no need to provide a conventional transparent insert in the top sliding roof part. However, such an insert can be provided in the top sliding roof in co-operation with the lining cover if, for example, the latter consists mainly of a translucent or opaque material with apertures.

In order that the present invention may be clearly understood and readily carried into effect, reference will now be made, by way of example, to the accompanying drawings in which.

Figures 1, 1A:
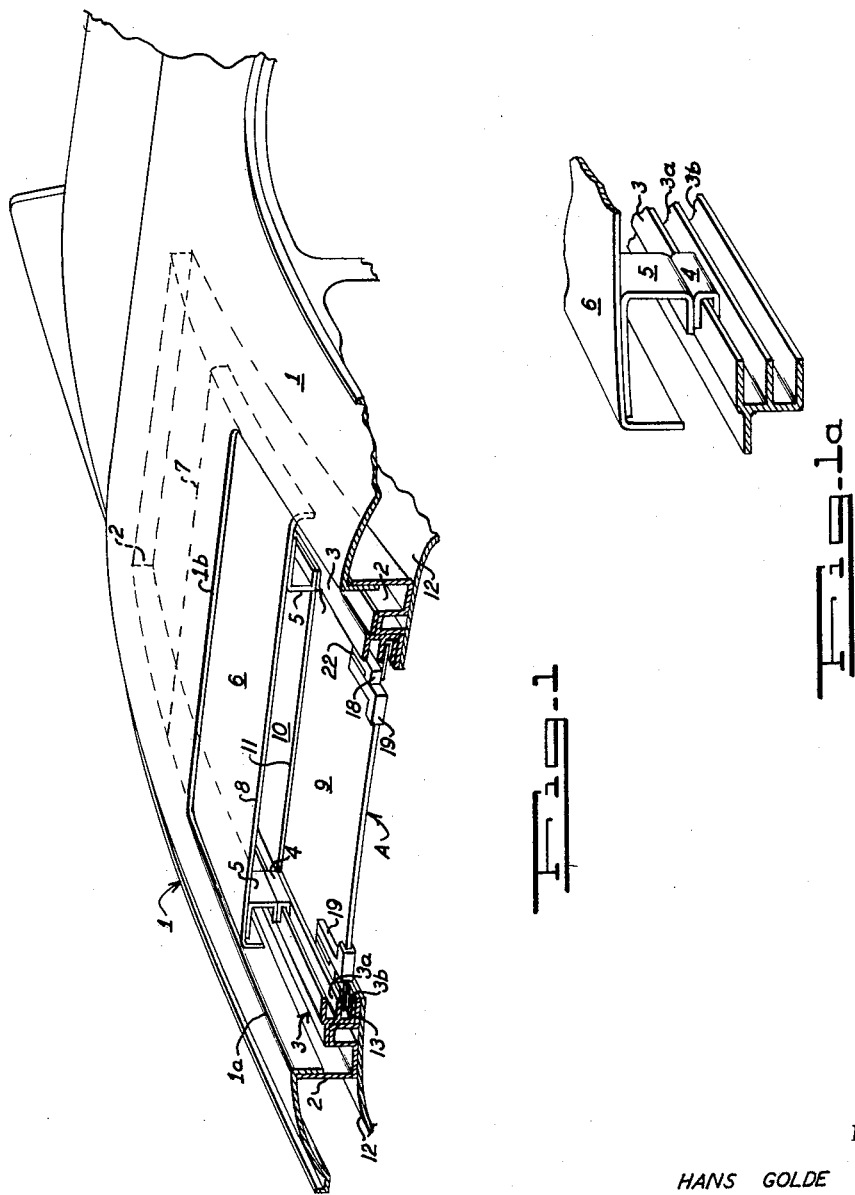
FIGURE 1 is a diagrammatic view of a part of a vehicle roof fitted with a top sliding roof part and a light-permeable lining cover shown partly in section.
FIGURE 1a is a diagrammatic view to an enlarged scale of the guide means for the top sliding roof part shown in FIGURE 1, the other parts being omitted or shown fragmented.
Figure 4:
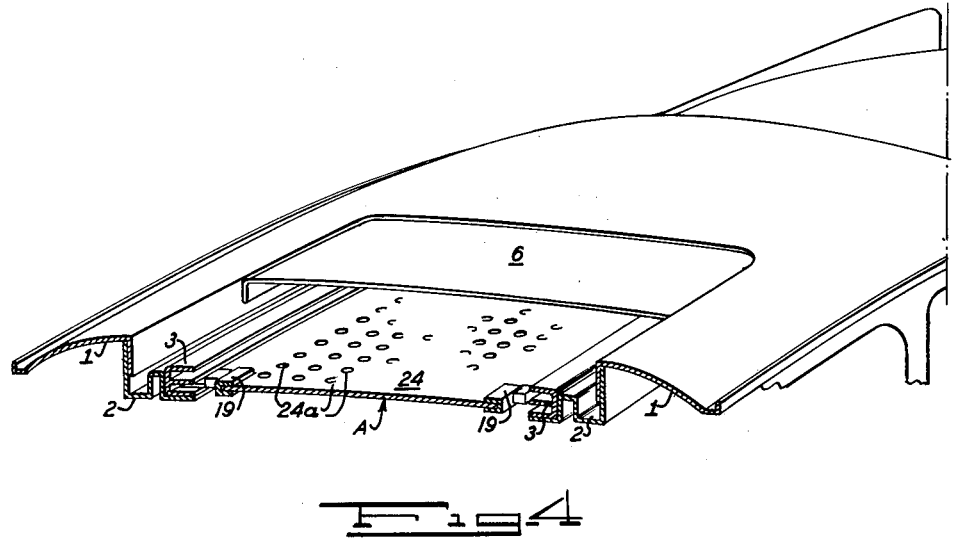
Figure 5:
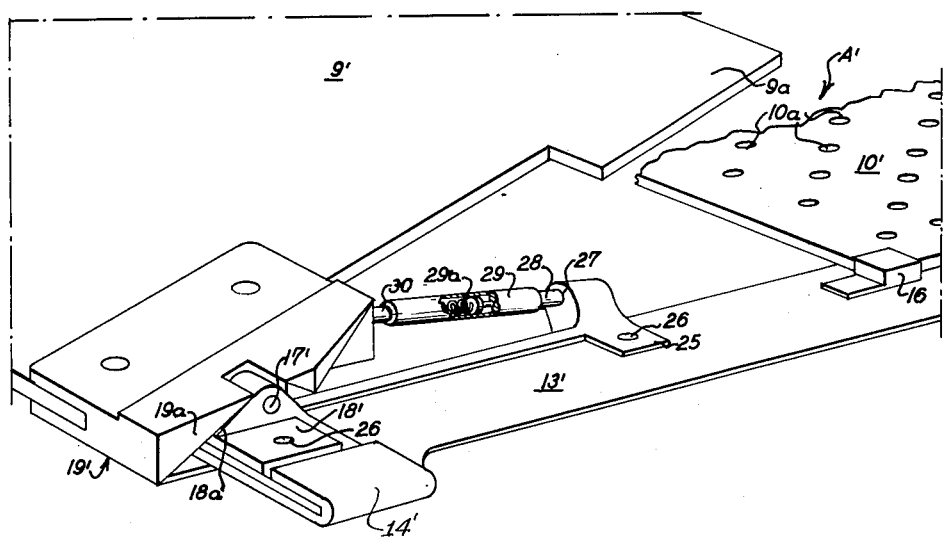

FIGURE 2 diagrammatically illustrates a part of the lining cover shown in FIGURE 1 in co-operation with a device for tilting the front part of the lining cover. The front part being shown in the tilted position and the top sliding roof part being omitted;

FIGURE 3 is a sectional view, taken along the line III—III in FIGURE 2, showing the front lining cover part tilted into a position co-planar with the back lining cover part, the top sliding roof part being omitted;

FIGURE 4 is a view corresponding to FIGURE 1 but of another embodiment of the lining cover; and FIGURE 5 diagrammatically illustrates a modification of the lining cover shown in FIGURE 4 in a view corresponding to FIGURE 2 and a modification of the tilting device.

FIGURE 1 shows a sliding roof fitted in a vehicle, with the provision of the conventional top sliding roof part and of the lining cover A.

Rigidly secured to the rigid roof part 1 of the motor vehicle is a roof frame 2 which adjoins aperture 1a of the roof and which is provided with guide rails 3 (FIGURES 1, 1a, 3) extending lengthwise of the vehicle. At least two guide shoes 4 are slidable in each top channel 3a of each lateral guide rail 3. The shoes 4 are rigidly secured to spacers 5, and connected to the bent flanges thereof is an upper cover 6 which is preferably opaque and which is slidable along the rails by means of the shoes 4. In the position shown in FIGURE 1 the cover 6 has been partly retracted below the fixed vehicle roof and the rear edge 7 of the cover 6 is indicated by broken lines. The view of the cover 6 is broken away at an edge 8 to show the lining cover A which comprises a front part 9 and a rear part 10 abutting one another at 11 and aligned to form a continuous surface. In the embodiment illustrated in FIGURES 1 to 3 the two parts 9, 10 mainly consist of a transparent or translucent material, for instance, thermoplastic glass.

When in the forward position shown in FIGURE 1, the lining cover A closes an aperture in the vehicle roof lining 12 which lining is rigidly secured to the fixed roof part 1 and to the roof frame 2, the last-mentioned aperture being below the aperture 1a of the fixed roof 1. The lining cover A has a frame 13 (see FIGURES 2, 3) which is slidable lengthwise, in channels 3b of the rails 3, on two guide members 14 and 15 which are covered with a soft material, for instance felt, and which are in the form of lateral projections extending adjacent the front and rear ends of the frame 13. The back part 10 of the lining cover A is rigidly secured to the frame 13 by means of metal fittings 16 while the front part 9 of the lining cover A has extending laterally therefrom pins 17 which are rotatably mounted in metal fittings 18 rigidly secured to the frame 13 and which are attached to corner mountings 19 engaging firmly around the front corners of the part 9. Each fitting 18 is formed with one elongated slot 20 in which a pin 21 rigidly secured to the bottom of a guide arm 22 slides. The arrangement on the right-hand side of the cover A is the same as on the left-hand side shown, but laterally reversed. Each arm 22 is pivotally mounted at 23 on one of the corner mountings 19. By means of a clamping device (not shown in the drawings), the pin 21 can be located in any desired position in the slot 20, i.e. the front part 9 of the lining cover A can be located in any desired inclined position within the range provided. The clamping device can, for instance, reside in that the pin 21 projects inwards through a bore in the guide rod 22 and is provided on its inwardly projecting end with a locknut or butterfly nut for tightening the pin head 21a (shown in chain lines) against the fitting 18.

If, as shown in FIGURE 2, no such clamping device is provided, the part 9 can be placed only in one of two end positions, i.e. in the raised position as shown, or in the lowered position where the front part 9 is flush with the back part 10. The parts 9, 10 need not be plane but can be arcuate.

In the embodiment illustrated in FIGURES 1 to 3, both the parts 9 and 10 of the lining cover A are made of a preferably clear transparent material, for instance, thermoplastic glass, so that when the sliding cover 6 is open there is a clear view upwardly, even though the lining cover A may be closed. The front part 9 thereof can be tilted in the manner described in order to ventilate the vehicle interior. When in the raised position the front part also acts as a windbreak so that excessive drafts do not occur in the vehicle.

The tilting mechanism can be other than that described. Furthermore, the material used for the parts 9, 10 can be colored, semi-transparent, translucent, or roughened to reduce sun dazzle. If required, only one of the parts 9 or 10, preferably the back part 10, can be completely transparent, while the other part is only semi-transparent or translucent or even opaque.

In the embodiment illustrated in FIGURE 4 the various elements are denoted by the same references as used in FIGURES 1 to 3. The lining cover A is substantially opaque and only a reduced amount of light passes through it, since it is composed of a single piece 24 of perforated material or of a number of pieces of different material, for instance, perforated metal, perforated opaque plastic, or perforated sheet metal sprayed with lacquer, plastic or plastic flakes. The perforations 24a are uniformly distributed over most, if not all, of the cover, i.e. over more than one-half of its covering surfaces and can be so small as to ensure that only indirect light reaches the passengers. This embodiment helps to reduce sun dazzle and to ventilate the vehicle interior when the lining cover A is closed and the sliding cover 6 is open.

In the embodiment illustrated in FIGURE 5, a two-piece lining cover similar to the design shown in FIGURE 2 is illustrated. The back part 10' of the lining cover consists of perforated opaque material as used for the embodiment shown in FIGURE 4, the latter material being formed with a plurality of evenly-distributed perforations 10a, while the front part 9' of the lining cover can be tilted as in FIGURE 2 and consists of a rigid material which can be, for instance, opaque or, preferably, partly light-permeable, i.e. transparent, colored, or translucent. At least half of the total surface area of the two parts 9', 10' together should consist of material adapted to let at least some light through. If desired, the front part 9' could be made of a material perforated like the part 10'.

In the embodiment shown in FIGURE 5 a raising device different from that shown in FIGURES 2 and 3 is used. Secured to each front corner of the part 9' is a corner mounting 19' from which extends laterally a pivot 17'. Each pivot 17' is rotatably mounted in a metal fitting 18' which is rigidly secured to the front end of the frame 13' of the lining cover A' and which has a rearwardly extending projection 25 secured to the frame 13' in the same way as the metal fitting 18', for instance, by rivets 26. Each extension 25 is provided with a push-in mounting 27 for a pin 28 of a spring cage 29. At the other end of the spring cage 29 another pin 30 engages in a corresponding mounting provided on an extension projecting from the corner mounting 19'. Each cage 29 is provided with a partly-visible compression spring 29a, one end of which bears against the front inner end of the cage 29 and the other end of which bears against the pin 28. Hence each corner mounting 19' always bears resiliently against the associated extension 25, the arrangement being such that the spring 29a operates like the spring of a toggle joint when the dead center position is passed. When the front part 9' lies flat and is flush with the back part 10', a part 9a of the cover part 9' is held firmly against the frame 13', whereas, in the extreme position shown, the cover part 9' is maintained in the outwardly-pivoted position by the spring cage 29, an extension 19a of each mounting 19' bearing against a bearing surface 18a of the associated fitting 18', so that the raised front part 9' cannot pivot any further upwards and is prevented by the springing device from falling back to a position flush with the part 10'. Only when the part 9' is forcibly pulled down manually by means of a handle (not shown) is the spring force overcome, the cage 29 passing beyond its dead center position and the part 9' moving into the flush position. As in the embodiment illustrated in FIGURES 2 and 3, the lining cover A' is slidable lengthwise on cloth-covered lateral extensions 14' of the frame 13' which, like the extensions 14 shown in FIGURES 2 and 3, can slide in the channel 3b of each rail 3. The channels 3a of the rails 3 form a slideway for the top sliding roof part (not shown in FIGURE 5).

It will be apparent that other embodiments are possible within the scope of the invention. For instance, the lining cover A could be subdivided into a number of component parts each adapted to be upwardly tilted about a transverse axis or in other ways. Nor is the invention limited to details of the examples illustrated but includes within the scope of the claims all light-permeable roof tops or roof top parts or lining cover parts for any desired sliding roofs and the raising of such a head lining or lining cover part used instead of a conventional cloth lining cover.

So far as the construction of the lining cover is concerned, it does not matter what form the upper sliding roof part takes, provided that the upper sliding roof part can co-operate with the lining cover and can be moved independently thereof. For instance, instead of the illustrated top sliding roof part a conventional upper sliding roof part consisting mainly of a foldable material can be used. It could be displaceably guided in the roof frame, for instance, in the rails 3, through a front strut or hoop and/or other frame parts. In other words, the lining cover can, if required, be used for motor vehicle folding roofs.

Also, any desired non-manual, for instance, mechanical and/or electric drives and controls, can be used to move both the top sliding roof part and the bottom lining cover and/or lining cover parts, even though manual operation is preferred to move the lining cover or lining cover parts into the fully closed or partly closed position. However, automatic opening of the lining cover or lining cover parts independently of the top sliding roof parts can be provided, and the lining cover or lining cover parts can be closed by a mechanical operation of the top sliding roof part. Such drives and controls for the displaceable top roof part and lining cover and lining cover parts can take any desired appropriate form.

The invention is for use preferably for passenger motor vehicles and other road motor vehicles such as trucks or caravan trailers, although it could clearly be used on other vehicles, for instance, railway vehicles or trailers.

I claim:

1. A vehicle roof comprising portions defining an aperture, an upper sliding roof portion for closing said aperture, at least two rigid lower roof portions in alignment and forming a continuous surface, guide means on both sides of said aperture in substantially parallel relation and extending beyond said aperture, the guide means being operatively associated with the upper sliding roof portion for guiding the same, frame members displaceably supported in the parallel guide means independently of the upper roof portion, said two rigid lower roof portions being supported on and displaceable with the frame members, and tilter means operatively associated with one of said rigid lower roof portions for tilting said one portion out of alignment with the other of said lower roof portions.

2. A vehicle roof as claimed in claim 1 wherein said two rigid lower roof portions are positioned with said one roof portion forwardly of the other said roof portion.

3. A vehicle roof as claimed in claim 1 wherein at least half of the rigid lower roof portions is constituted by material which is permeable to light.

4. A vehicle roof as claimed in claim 1 wherein a part of said lower roof portions is provided with perforations whereby said part is permeable to light.

5. A vehicle roof as claimed in claim 1, wherein said guide means are guide channels.

6. A vehicle roof as claimed in claim 5, further comprising: means operatively associated with said tilter means for adjusting the tilting of said one roof portion and for locking the same in position.

References Cited in the file of this patent

FOREIGN PATENTS

| | | |
|---|---|---|
| 65,908 | Norway | Mar. 8, 1943 |
| 255,601 | Great Britain | July 29, 1926 |
| 372,050 | Great Britain | May 5, 1932 |
| 532,146 | Great Britain | Jan. 17, 1941 |
| 638,173 | France | May 18, 1928 |
| 677,384 | Great Britain | Aug. 13, 1952 |